United States Patent
Martin (10) Patent No.: US 8,370,765 B2
(45) Date of Patent: Feb. 5, 2013

(54) COMPUTER SYSTEM AND METHOD FOR INHIBITING INTERRUPTION OF A USER THAT IS ACTIVELY USING THE COMPUTER SYSTEM

(76) Inventor: Derek P. Martin, Carthage, MO (US)

( * ) Notice: Subject to any disclaimer, the term of this patent is extended or adjusted under 35 U.S.C. 154(b) by 2718 days.

(21) Appl. No.: 10/967,446

(22) Filed: Oct. 18, 2004

(65) Prior Publication Data

US 2006/0085581 A1    Apr. 20, 2006

(51) Int. Cl.
*G06F 3/048* (2006.01)
(52) U.S. Cl. ......... 715/796; 715/794; 715/790; 715/788
(58) Field of Classification Search .................. 715/796; 710/262
See application file for complete search history.

(56) References Cited

U.S. PATENT DOCUMENTS

| | | | |
|---|---|---|---|
| 6,476,832 B1 * | 11/2002 | Park | 715/789 |
| 6,735,487 B1 * | 5/2004 | Marshall et al. | 700/90 |
| 2003/0048286 A1 * | 3/2003 | Lal | 345/700 |
| 2005/0108297 A1 * | 5/2005 | Rollin et al. | 707/201 |

* cited by examiner

*Primary Examiner* — Sara England
(74) *Attorney, Agent, or Firm* — Martin & Associates, LLC; Derek P. Martin (57) ABSTRACT

A computer system and method inhibit interruption of a user that is actively using the computer system. A user is actively using the computer system if the user has provided defined input within a time period specified in a "do not disturb" specification. For example, if the time period in the "do not disturb" specification is set to ten seconds, a user will not be interrupted by a potential interrupting event if the user has, for example, pressed a keyboard key or clicked a mouse key within ten seconds of the potential interrupting event. In this manner a user that is actively using a computer system will not be interrupted by potential interrupting events. In a first embodiment, the do not disturb mechanism is defined globally in the operating system. In a second embodiment, each software application may include a "do not disturb" specification.

12 Claims, 5 Drawing Sheets

COMPUTER SYSTEM AND METHOD FOR INHIBITING INTERRUPTION OF A USER THAT IS ACTIVELY USING THE COMPUTER SYSTEM

BACKGROUND OF THE INVENTION

1. Technical Field

This invention generally relates to computer systems, and more specifically relates to apparatus and methods for determining the function of a computer system in response to user input.

2. Background Art

Modern computer systems are tools that many people use on a daily basis. For many people, their time at work is spent to a large degree working on a computer system. Modern computer systems support the execution of many different software applications all at the same time. Sometimes when a user is actively using his or her computer system, some interrupting event occurs that interrupts what the user is doing. Pop-ups are a well-known example of an event that may interrupt the user's work. For example, if the user is typing in a work processor when a pop-up is activated, the pop-up typically is placed in front of the word processor screen. This requires a user to close down the pop-up window and then resume working in the word processor.

Pop-up blockers are known in the art, but are not 100% effective. In addition, there are may other types of events that could interrupt a user when actively working on their computer. For example, an e-mail program might provide a notification screen when a new e-mail is received. An antivirus program might provide a notification screen when a virus is detected. Other software applications may be running that interrupt the user periodically when user input is required. For example, a compiler could be executed to compile a sizable computer program, and the user could then perform other functions while the compiler does its work. However, the compiler, when finished, could interrupt the user. One can see from these simple examples that there exists a wide array of things that can interrupt a user while actively working on a computer. If a user is in the middle of entering text in a word processor, or entering data into a spreadsheet, or entering data into a database, or performing any other activity, the interruption is not only annoying, but negatively affects the user's efficiency and performance.

DISCLOSURE OF INVENTION

According to the preferred embodiments, a computer system and method inhibit interruption of a user that is actively using the computer system. A user is actively using the computer system if the user has provided defined input within a time period specified in a "do not disturb" specification. For example, if the time period in the "do not disturb" specification is set to ten seconds, a user will not be interrupted by a potential interrupting event if the user has, for example, pressed a keyboard key or clicked a mouse key within ten seconds of the potential interrupting event. In this manner a user that is actively using a computer system will not be interrupted by potentially interrupting events. In a first embodiment, the do not disturb mechanism is defined globally in the operating system. In a second embodiment, each software application may include a "do not disturb" specification which is enforced by the operating system. Instead of interrupting the user, the do not disturb mechanism of the preferred embodiments may provide other notification, such as a flashing item on the task bar or system tray, to visually indicate to the user that a potentially interrupting event has occurred without interrupting the user.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The preferred embodiments provide a way to inhibit interrupting a user when a user is actively using a computer. A do not disturb specification is defined with specified user input types and a specified time period. When a potentially interrupting event occurs, the do not disturb mechanism of the preferred embodiments checks to see if the potentially interrupting event and any defined user input occurred within the specified time period. If so, the potentially interrupting event is inhibited from interrupting the user. If not, the potentially interrupting event is allowed to occur.

Figure 1:
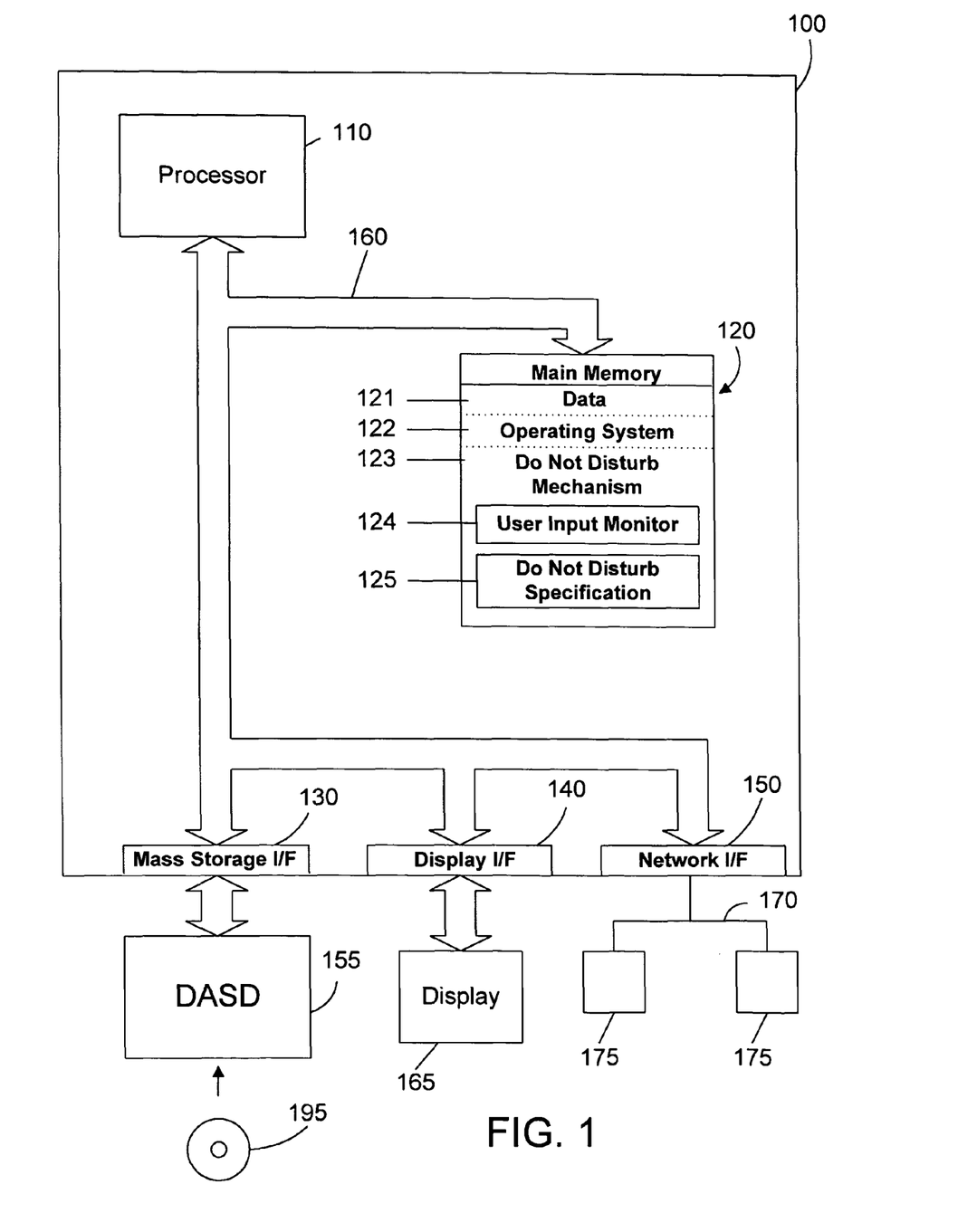
FIG. 1 is a block diagram of an apparatus in accordance with the preferred embodiments.

Referring now to FIG. 1, a computer system 100 is one suitable implementation of an apparatus in accordance with the preferred embodiments of the invention. Computer system 100 is an IBM-compatible personal computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device 155 is a readable and writable CD RW drive, which may store data to and read data from a CD RW 195.

Main memory 120 in accordance with the preferred embodiments contains data 121, an operating system 122, and a do not disturb mechanism 123. Data 121 represents any data that serves as input to or output from any program in computer system 100. Operating system 122 is a multitasking operating system known in the industry as Windows XP; however, those skilled in the art will appreciate that the spirit and scope of the present invention is not limited to any one operating system. Do not disturb mechanism 123 includes a user input monitor 124 and a do not disturb specification 125. The do not disturb specification 125 specifies one or more user input types and a time period. The do not disturb specification 125 is used in conjunction with the user input monitor 124 to determine whether a potentially interrupting event may interrupt the user or not. Thus, if the do not disturb specification 125 specifies user input types of mouse clicks and keys pressed, with a time period of 10 seconds, when a potentially interrupting event occurs, the user input monitor 124 determines whether a mouse click or key press occurred within 10 seconds of the potentially interrupting event. If so, the potentially interrupting event is not allowed to interrupt the user's active use of the computer system. If not, the potentially interrupting event is allowed to occur.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, and do not disturb mechanism 123 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD RW (e.g., 195 of FIG. 1), and transmission type media such as digital and analog communications links.

Figure 2:
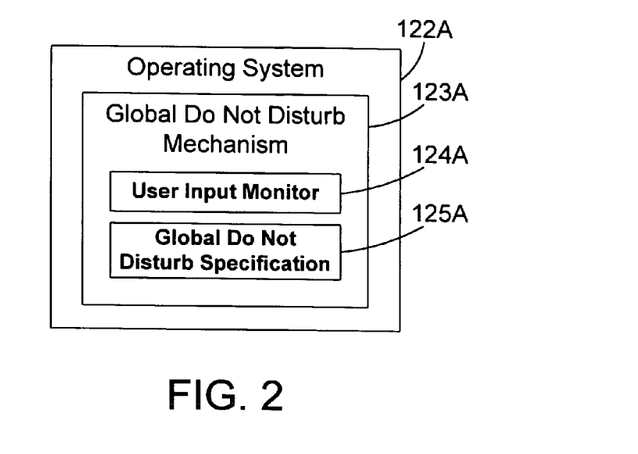
FIG. 2 is a block diagram of a first specific implementation for the Do Not Disturb Mechanism in FIG. 1 in accordance with a first embodiment.
Figure 3:
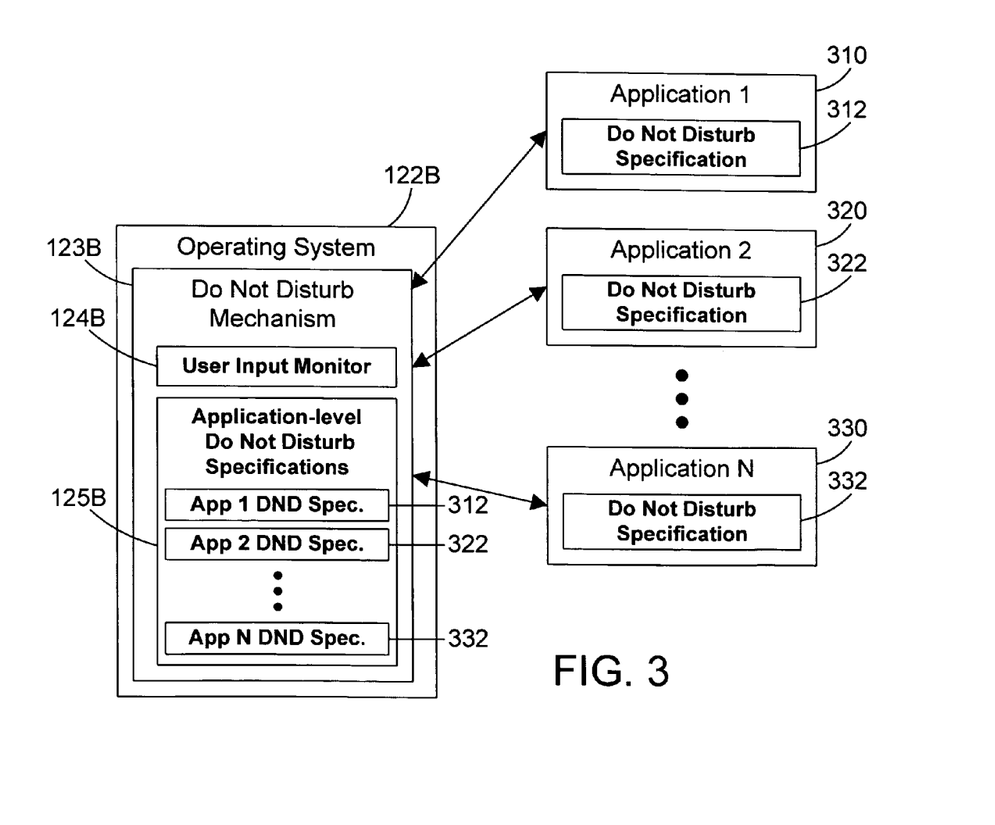
FIG. 3 is a block diagram of a second specific implementation for the Do Not Disturb Mechanism in FIG. 1 in accordance with a second embodiment.

The do not disturb mechanism 123 may be implemented in different ways as shown by the two sample embodiments in FIGS. 2 and 3. One implementation in accordance with the first embodiment is shown in FIG. 2. In this embodiment, the do not disturb mechanism 123A is a global do not disturb mechanism residing within the operating system 122A, which means that all software running under control of the operating system will be treated in the same manner: if the user input monitor 124A detects that a potentially interrupting event occurs within the time period specified in the global do not disturb specification 125A of any user input specified in the global do not disturb specification 125A, the potentially interrupting event is inhibited from interrupting the user. If the user input monitor 124A detects that a potentially interrupting event occurs outside the time period specified in the global do not disturb specification 125A of any user input specified in the global do not disturb specification 125A, the potentially interrupting event is allowed to occur. The first embodiment shown in FIG. 2 is a very simple way to provide a global do not disturb mechanism in accordance with the preferred embodiments.

An implementation in accordance with the second embodiment is shown in FIG. 3. In this case, instead of defining a single global do not disturb specification that applies to all software running under the operating system's control, each software application may includes its own do not disturb specification. Thus, software application 310 may include its own do not disturb specification 312. In like manner, software application 320 may include its own do not disturb specification 322, and software application 330 may include its own do not disturb specification 332. These do not disturb specifications 312, 322 and 332 are communicated to the do not disturb mechanism 123B within the operating system 122B. The do not disturb mechanism 123B includes a user input monitor 124B, similar to the user input monitor 124A in FIG. 2. Note, however, that the do not disturb mechanism 123B in this second embodiment includes different do not disturb specifications for each application. Thus, the application-level do not disturb specifications 312, 322 and 332 for each application 310, 320 and 330, respectively, are located within the application-level do not disturb specifications 125B that are accessible by the do not disturb mechanism 123B within the operating system 122B. This may be done via any suitable mechanism, such as the operating system querying the applications, or a registration process where the applications register with the operating system. Once application-level do not disturb specifications are defined, the do not disturb mechanism 123B in the operating system 122B can inhibit user interruption by a potentially interrupting event based on the specified do not disturb mechanism corresponding to the application the user is currently using.

Note that the second embodiment does not require that a do not disturb specification be defined for each application running on the computer system. It simply gives the option of providing application-level do not disturb specifications so the function of the do not disturb mechanism of the preferred embodiments may be customized to act differently for different software applications. It is also within the scope of the second embodiment to provide application-level do not disturb specifications for only some of the applications. It is also within the scope of the second embodiment to provide a default do not disturb specification that applies to all applications that do not have an explicitly-defined application-level do not disturb specification. For those applications that have an application-level do not disturb specification, the application-level do not disturb specification will take precedence over the default do not disturb specification.

Figure 4:
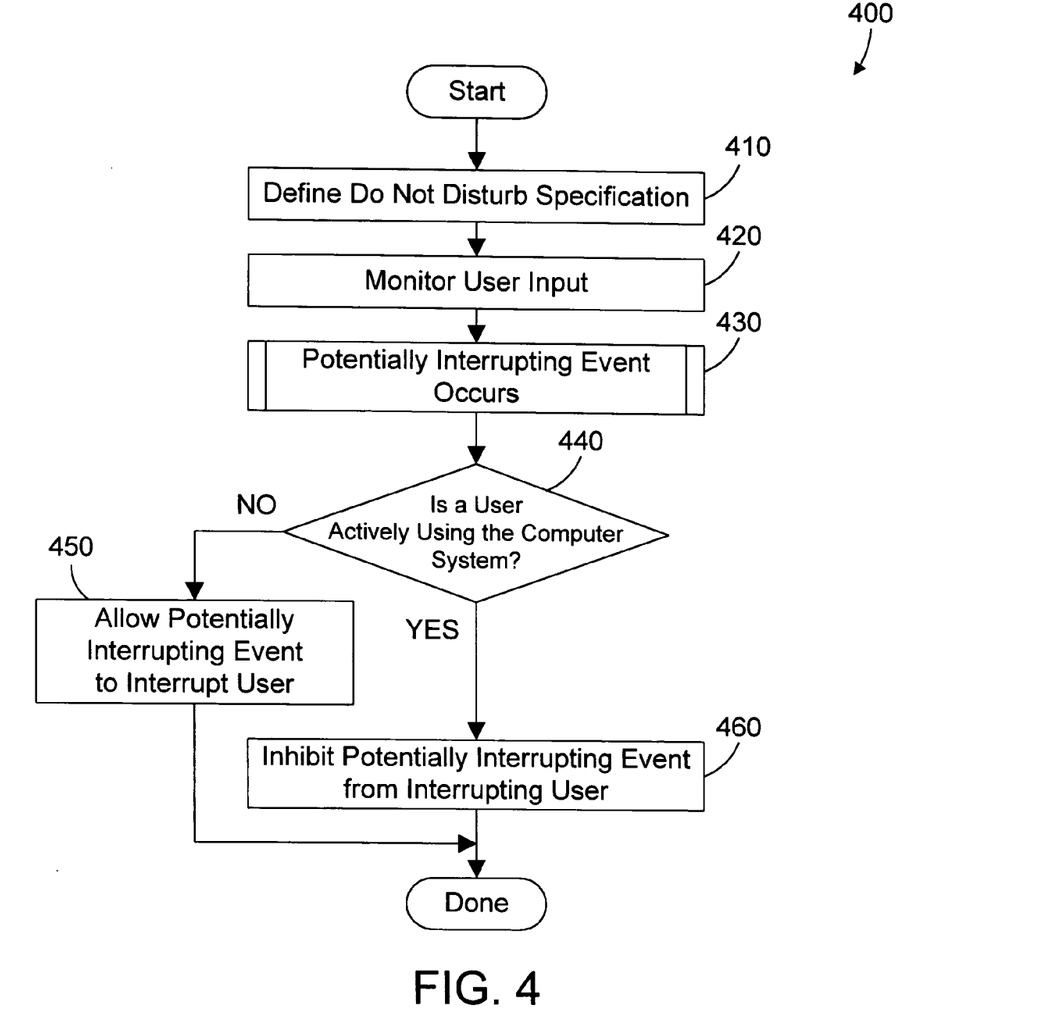
FIG. 4 is a flow diagram of a method for inhibiting a potential interrupting event from interrupting a user that is actively using the computer system in accordance with the preferred embodiments.

Referring to FIG. 4, a method 400 in accordance with the preferred embodiments allows the definition of one or more do not disturb specifications (step 410). This definition is preferably done by a human user, but could also be done by a software agent. The user's input is monitored (step 420). A potentially interrupting event then occurs (step 430). If the user is not actively using the computer system (step 440=NO), the potentially interrupting event is allowed to occur (step 450). If the user is actively using the computer system (step 440=YES), the potentially interrupting event is inhibited from interrupting the user (step 460). In the preferred embodiments, the do not disturb specification defined in step 410 includes one or more specified user input types, and a time period. In the specific implementation shown in FIG. 4, a user is actively using the computer system in step 440 if the potentially interrupting event in step 430 and a specified user input type specified in the do not disturb specification have both been performed within the time period specified in the do not disturb specification. If there is no specified user input type specified in the do not disturb specification that occurs within the time period specified in the do not disturb specification, the user is not actively using the computer system in step 440. In this manner a user may prevent interrupting events from occurring while the user is actively using the computer system, while allowing the interrupting events to occur when the user is not actively using the computer system.

Note that the "potentially interrupting event" herein is an event, such as a display of a window to a user, that might normally interrupt the user when the user is busy working in another software application. For example, an antivirus program may provide instant notification to a user when a virus is detected. Thus, when a virus is detected, the antivirus program instructs the operating system to display the notification window to the user. The potentially interrupting event here is not the detection of the virus, but the display of the virus notification window. The term "potentially interrupting event" is intended herein in its broadest sense to be anything that, if allowed to happen, requires action by the user to go back to what the user was doing. In this simple example, the display of the virus notification window would be a potentially interrupting event, because the display of the window will require the user to either close down the virus notification window or perform some other action to invoke a different window to continue working. Thus, if a user is actively typing in a wordprocessor when a virus is detected, the do not disturb mechanism of the preferred embodiments may inhibit the virus notification window from being displayed. Note, however, that alternative notification to the user could be substituted, as long as the alternative notification does not interrupt the user. For example, an icon in a task bar could flash to indicate that a potentially interrupting event was inhibited. In the alternative, a flashing icon in the system tray could notify the user of the detected virus without interrupting the user. In yet another alternative, a message may be displayed on the screen that notifies the user, but is then removed without any action by the user, thereby allowing the user to continue working without having to shut down a window or click on the application the user was using. The inhibiting of a potentially interrupting event in the scope of the preferred embodiments and claims expressly extends to the inhibiting of any event that would normally interrupt the user, so the user is not interrupted.

Figure 5:
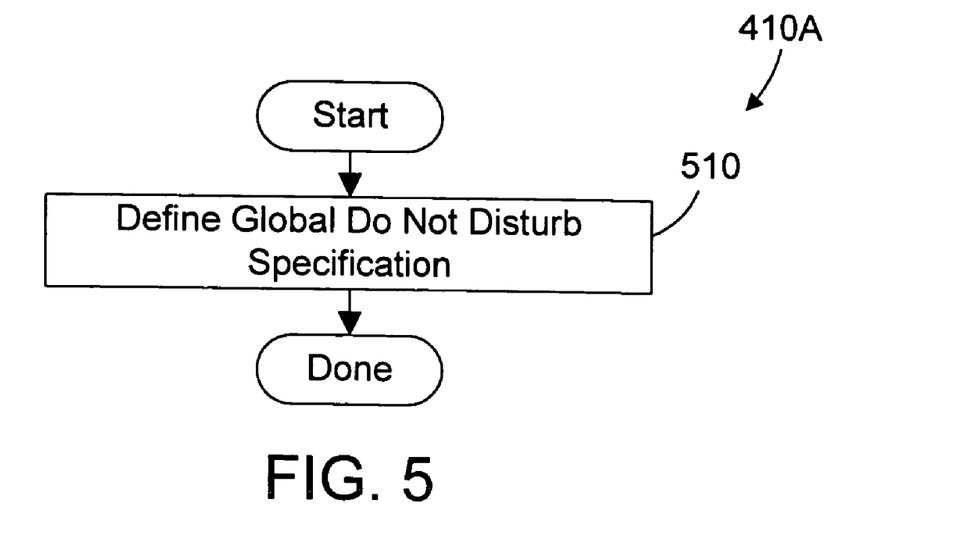
FIG. 5 is a flow diagram showing a first implementation of step 410 in FIG. 4 in accordance with the first embodiment.

Step 410 in method 400 in FIG. 4 is where one or more do not disturb specifications are defined. FIG. 5 shows one suitable implementation 410A for step 410 in FIG. 4 in accordance with the first embodiment in FIG. 2 that includes a global do not disturb specification 125A. In this embodiment, step 410A comprises the step of defining the global do not disturb specification (step 510).

Figure 6:
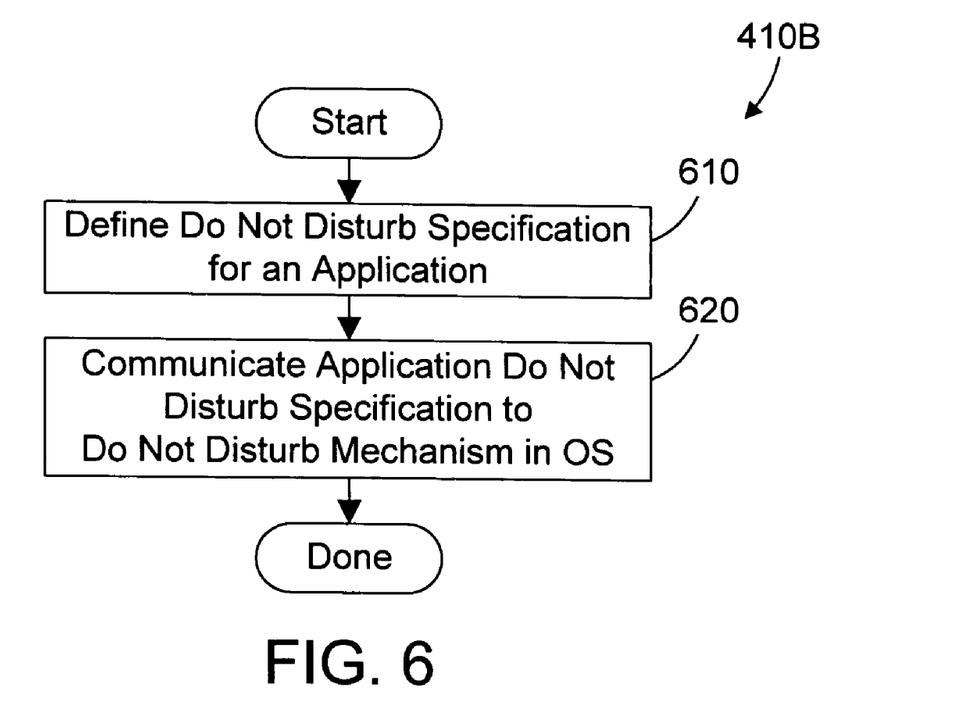
FIG. 6 is a flow diagram showing a second implementation of step 410 in FIG. 4 in accordance with the second embodiment.

FIG. 6 shows one suitable implementation 410B for step 410 in FIG. 4 in accordance with the second embodiment in FIG. 3 that includes application-level do not disturb specifications 125B. A do not disturb specification is defined for an application (step 610). This do not disturb specification is then communicated to the do not disturb mechanism in the operating system (step 620).

The first embodiment herein uses a global do not disturb specification for all programs running under control of the operating system. The second embodiment uses application-level do not disturb specifications for different applications running under control of the operating system. In both cases, the inhibiting of the potentially interrupting event is done within the operating system, because only the operating system has the requisite level of control to inhibit all potentially interrupting events generated by all applications. Note, however, that a do not disturb mechanism that is not part of the operating system could also be defined, assuming that all communications for potentially interrupting events could be routed through the do not disturb mechanism, thereby allowing the do not disturb mechanism to inhibit a potentially interrupting event if the user is actively using the computer system.

Figure 7:
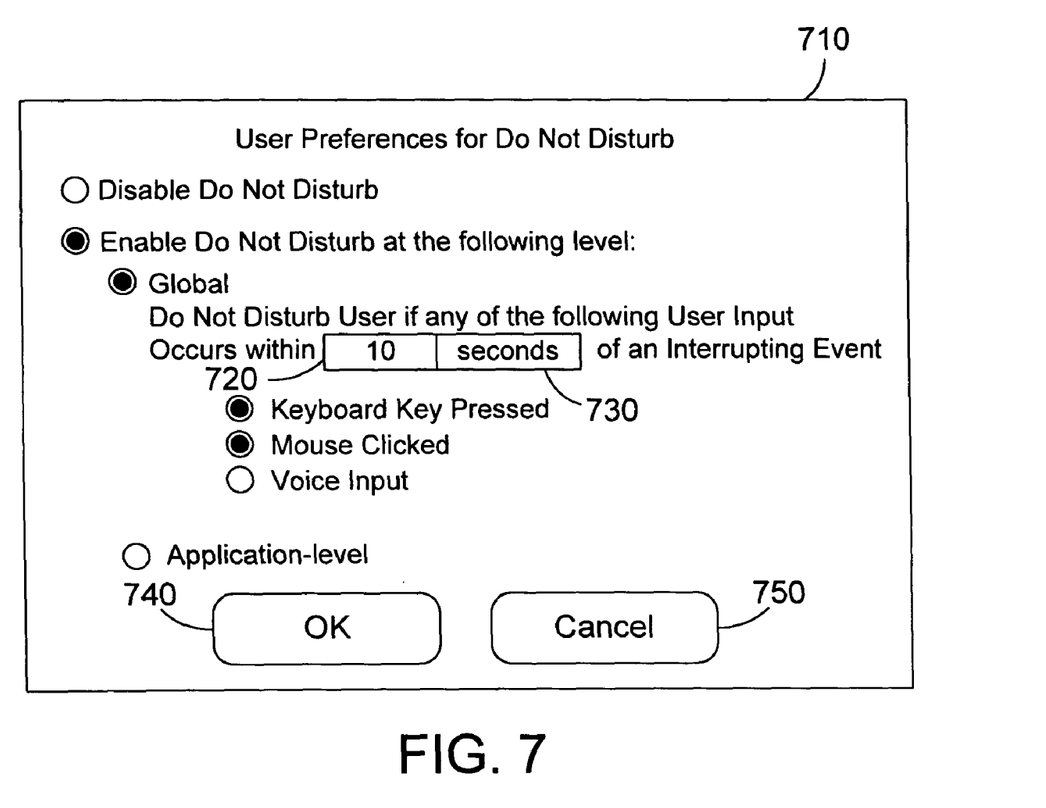
FIG. 7 is a sample display window that allows a user to set a do not disturb specification in accordance with the preferred embodiments.

Referring to FIG. 7, a display window 710 shows a potential user interface for defining a do not disturb specification within the scope of the preferred embodiments. This interface allows the user to disable the do not disturb function disclosed herein. It also allows the user to enable the do not disturb at the two different levels corresponding to the two different embodiments discussed herein. For the specific example in FIG. 7, we assume the user selects the global do not disturb, which corresponds to the first embodiment herein. The user enters a number in a first box 720 and a time denomination (e.g., seconds, minutes, etc.) in the second box 730. Of course, the user could also select appropriate values from drop-down menus, as is known in the art. In addition to defining the time period of 10 seconds in display 710, the user also selects two of the three listed user inputs, namely keyboard key pressed and mouse clicked. Once the user has selected these preferences, the user could click on the OK button 740 to save these values for the global do not disturb specification, or could click the Cancel button 750 to close down the display window 710 without saving the selections. If the user clicks on Application-level do not disturb, then clicks the OK button 740, one or more additional display windows would be presented to the user to allow the user to specify do not disturb specifications for each application. In the alternative, the user could specify do not disturb specifications for each software application as each software application is installed, or by setting user preferences for each software application that include the do not disturb specification.

The preferred embodiments greatly enhance the productivity of those who work extensively on computers by inhibiting potentially interrupting events from interrupting a user that is actively using a computer system. By minimizing the interruptions to a user, the user will be less annoyed due to reduced frequency of unwelcome interruptions, and the user's productivity will be increased.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, the specified user input in the do not disturb specification can include any conceivable form of user input, whether currently known or developed in the future.

What is claimed is:

1. A computer comprising:
   at least one processor;
   a memory coupled to the at least one processor;
   first and second software applications residing in the memory and executed by the at least one processor, the first software application including a first do not disturb specification that comprises first user input type and a corresponding first time period and second user input type and a corresponding second time period, the second software application including a second do not disturb specification that comprises the first user input type and a corresponding third time period and the second user input type and a corresponding fourth time period; and
   an operating system residing in the memory and executed by the at least one processor, the operating system including a do not disturb mechanism comprising:
      a user input monitor that monitors input from a user and determines that the user is actively using the computer if any of the following are true;
         the user is using the first software application and the input from the user satisfies the first user input type and occurs within the first time period of a potentially interrupting event;
         the user is using the first software application and the input from the user satisfies the second user input type and occurs within the second time period of the potentially interrupting event;
         the user is using the second software application and the input from the user satisfies the first user input type and occurs within the third time period of a potentially interrupting event;
         the user is using the second software application and the input from the user satisfies the second user input type and occurs within the fourth time period of the potentially interrupting event;
      wherein the do not disturb mechanism inhibits the potentially interrupting event from interrupting the user when the user is actively using the computer.

2. The computer of claim 1 further comprising a global do not disturb specification defined in the operating system.

3. The computer of claim 1 wherein the first and second do not disturb specifications are application-level specifications defined for the first and second software applications.

4. A computer-implemented method for inhibiting a potentially interrupting event from interrupting a user of a computer, the method comprising the steps of:
   (A) the user defining a first do not disturb specification that comprises first user input type and a corresponding first time period and second user input type and a corresponding second time period;
   (B) the user defining a second do not disturb specification that comprises the first user input type and a corresponding third time period and the second user input type and a corresponding fourth time period;
   (C) an operating system on the computer monitoring user input to determine the user is actively using the computer if any of the following are true;
      the user is using the first software application and the input from the user satisfies the first user input type and occurs within the first time period of a potentially interrupting event;
      the user is using the first software application and the input from the user satisfies the second user input type and occurs within the second time period of the potentially interrupting event;
      the user is using the second software application and the input from the user satisfies the first user input type and occurs within the third time period of a potentially interrupting event;
      the user is using the second software application and the input from the user satisfies the second user input type and occurs within the fourth time period of the potentially interrupting event;
   (D) if the user is actively using the computer, inhibiting the potentially interrupting event from interrupting the user; and
   (E) if the user is not actively using the computer, allowing the potentially interrupting event to occur.

5. The method of claim 4 further comprising a global do not disturb specification defined in the operating system.

6. The method of claim 4 wherein the first and second do not disturb specifications are application-level specifications defined for the first and second software applications.

7. A computer-readable program product comprising:
   (A) an operating system that includes a do not disturb mechanism comprising:
      (A1) a first do not disturb specification for a first software application that comprises first user input type and a corresponding first time period and second user input type and a corresponding second time period;
      (A2) a second do not disturb specification for a second software application that comprises the first user input type and a corresponding third time period and the second user input type and a corresponding fourth time period; and
      (A3) a user input monitor that monitors input from a user and determines that the user is actively using the computer if any of the following are true;
         the user is using the first software application and the input from the user satisfies the first user input type and occurs within the first time period of a potentially interrupting event;

the user is using the first software application and the input from the user satisfies the second user input type and occurs within the second time period of the potentially interrupting event;

the user is using the second software application and the input from the user satisfies the first user input type and occurs within the third time period of a potentially interrupting event;

the user is using the second software application and the input from the user satisfies the second user input type and occurs within the fourth time period of the potentially interrupting event;

(A4) wherein the do not disturb mechanism inhibits the potentially interrupting event from interrupting the user when the user is actively using the computer; and (B) recordable media bearing the operating system.

8. The program product of claim 7 further comprising a global do not disturb specification defined in the operating system.

9. The program product of claim 7 wherein the first and second do not disturb specifications are application-level specifications defined for the first and second software applications.

10. A computer comprising:

at least one processor;

a memory coupled to the at least one processor;

first and second software applications residing in the memory and executed by the at least one processor, the first software application comprising a first do not disturb specification that specifies a first user input type, a corresponding first time period, a second user input type, and a corresponding second time period, the second software application comprising a second do not disturb specification that specifies the first user input type, a corresponding third time period, the second user input type, and a corresponding fourth time period;

a third software application residing in the memory and executed by the at least one processor, the third software application not including a do not disturb specification;

an operating system residing in the memory and executed by the at least one processor, the operating system comprising:

a default do not disturb specification that specifies the first user input type, a corresponding fifth time period, the second user input type, and a corresponding sixth time period;

a do not disturb mechanism that receives the do not disturb specification from each of the plurality of software applications, the do not disturb mechanism performing the steps of:

monitoring input from a user;

when the user is using the first software application, determining the user is actively using the first software application if input from the user to the first software application is of the first user input type and occurs within the first time period of a potentially interrupting event;

when the user is using the first software application, determining the user is actively using the first software application if input from the user to the first software application is of the second user input type and occurs within the second time period of the potentially interrupting event;

when the user is using the first software application, determining the user is not actively using the first software application if input from the user to the first software application is of the first user input type and occurs outside the first time period of a potentially interrupting event and if input from the user to the first software application is of the second user input type and occurs outside the second time period of the potentially interrupting event;

if the user is actively using the first software application, inhibiting the potentially interrupting event from interrupting the user while using the first software application;

if the user is not actively using the first software application, allowing the potentially interrupting event to interrupt the user while using the first software application;

when the user is using the second software application, determining the user is actively using the second software application if input from the user to the second software application is of the first user input type and occurs within the third time period of a potentially interrupting event;

when the user is using the second software application, determining the user is actively using the second software application if input from the user to the second software application is of the second user input type and occurs within the fourth time period of the potentially interrupting event;

when the user is using the second software application, determining the user is not actively using the second software application if input from the user to the second software application is of the first user input type and occurs outside the third time period of a potentially interrupting event and if input from the user to the second software application is of the second user input type and occurs outside the fourth time period of the potentially interrupting event;

if the user is actively using the second software application, inhibiting the potentially interrupting event from interrupting the user while using the second software application;

if the user is not actively using the second software application, allowing the potentially interrupting event to interrupt the user while using the second software application;

when the user is using the third software application, determining the user is actively using the third software application if input from the user to the third software application is of the first user input type and occurs within the fifth time period of a potentially interrupting event;

when the user is using the third software application, determining the user is actively using the third software application if input from the user to the third software application is of the second user input type and occurs within the sixth time period of the potentially interrupting event;

when the user is using the third software application, determining the user is not actively using the third software application if input from the user to the third software application is of the first user input type and occurs outside the fifth time period of a potentially interrupting event and if input from the user to the third software application is of the second user input type and occurs outside the sixth time period of the potentially interrupting event;

if the user is actively using the third software application, inhibiting the potentially interrupting event from interrupting the user while using the third software application;

if the user is not actively using the third software application, allowing the potentially interrupting event to interrupt the user while using the third software application.

11. A computer-implemented method for inhibiting a potentially interrupting event from interrupting a user of a computer, the method comprising the steps of:

the user defining a first do not disturb specification that specifies a first user input type, a corresponding first time period, a second user input type, and a corresponding second time period;

the user defining a second do not disturb specification that specifies the first user input type, a corresponding third time period, the second user input type, and a corresponding fourth time period;

the user defining a default do not disturb specification that specifies the first user input type, a corresponding fifth time period, the second user input type, and a corresponding sixth time period;

monitoring input from a user;

when the user is using the first software application, determining the user is actively using the first software application if input from the user to the first software application is of the first user input type and occurs within the first time period of a potentially interrupting event;

when the user is using the first software application, determining the user is actively using the first software application if input from the user to the first software application is of the second user input type and occurs within the second time period of the potentially interrupting event;

when the user is using the first software application, determining the user is not actively using the first software application if input from the user to the first software application is of the first user input type and occurs outside the first time period of a potentially interrupting event and if input from the user to the first software application is of the second user input type and occurs outside the second time period of the potentially interrupting event;

if the user is actively using the first software application, inhibiting the potentially interrupting event from interrupting the user while using the first software application;

if the user is not actively using the first software application, allowing the potentially interrupting event to interrupt the user while using the first software application;

when the user is using the second software application, determining the user is actively using the second software application if input from the user to the second software application is of the first user input type and occurs within the third time period of a potentially interrupting event;

when the user is using the second software application, determining the user is actively using the second software application if input from the user to the second software application is of the second user input type and occurs within the fourth time period of the potentially interrupting event;

when the user is using the second software application, determining the user is not actively using the second software application if input from the user to the second software application is of the first user input type and occurs outside the third time period of a potentially interrupting event and if input from the user to the second software application is of the second user input type and occurs outside the fourth time period of the potentially interrupting event;

if the user is actively using the second software application, inhibiting the potentially interrupting event from interrupting the user while using the second software application;

if the user is not actively using the second software application, allowing the potentially interrupting event to interrupt the user while using the second software application;

when the user is using the third software application, determining the user is actively using the third software application if input from the user to the third software application is of the first user input type and occurs within the fifth time period of a potentially interrupting event;

when the user is using the third software application, determining the user is actively using the third software application if input from the user to the third software application is of the second user input type and occurs within the sixth time period of the potentially interrupting event;

when the user is using the third software application, determining the user is not actively using the third software application if input from the user to the third software application is of the first user input type and occurs outside the fifth time period of a potentially interrupting event and if input from the user to the third software application is of the second user input type and occurs outside the sixth time period of the potentially interrupting event;

if the user is actively using the third software application, inhibiting the potentially interrupting event from interrupting the user while using the third software application;

if the user is not actively using the third software application, allowing the potentially interrupting event to interrupt the user while using the third software application.

12. A computer-implemented method for handling a potentially interrupting event, the method comprising the steps of:

a user defining a first do not disturb specification that specifies a first user input type, a corresponding first time period, a second user input type, and a corresponding second time period;

the user defining a second do not disturb specification that specifies the first user input type, a corresponding third time period, the second user input type, and a corresponding fourth time period;

the user defining a default do not disturb specification that specifies the first user input type, a corresponding fifth time period, the second user input type, and a corresponding sixth time period;

monitoring input from a user;

when the user is using the first software application, determining the user is actively using the first software application if input from the user to the first software application is of the first user input type and occurs within the first time period of a potentially interrupting event;

when the user is using the first software application, determining the user is actively using the first software application if input from the user to the first software application is of the second user input type and occurs within the second time period of the potentially interrupting event;

when the user is using the first software application, determining the user is not actively using the first software application if input from the user to the first software application is of the first user input type and occurs outside the first time period of a potentially interrupting event and if input from the user to the first software application is of the second user input type and occurs outside the second time period of the potentially interrupting event;

if the user is actively using the first software application, providing a message from the potentially interrupting event to the user for a first predetermined time period, then automatically removing the message after the first predetermined time period expires without requiring input from the user;

if the user is not actively using the first software application, allowing the potentially interrupting event to interrupt the user while using the first software application;

when the user is using the second software application, determining the user is actively using the second software application if input from the user to the second software application is of the first user input type and occurs within the third time period of a potentially interrupting event;

when the user is using the second software application, determining the user is actively using the second software application if input from the user to the second software application is of the second user input type and occurs within the fourth time period of the potentially interrupting event;

when the user is using the second software application, determining the user is not actively using the second software application if input from the user to the second software application is of the first user input type and occurs outside the third time period of a potentially interrupting event and if input from the user to the second software application is of the second user input type and occurs outside the fourth time period of the potentially interrupting event;

if the user is actively using the second software application, providing a message from the potentially interrupting event to the user for a second predetermined time period, then automatically removing the message after the second predetermined time period expires without requiring input from the user;

if the user is not actively using the second software application, allowing the potentially interrupting event to interrupt the user while using the second software application;

when the user is using the third software application, determining the user is actively using the third software application if input from the user to the third software application is of the first user input type and occurs within the fifth time period of a potentially interrupting event;

when the user is using the third software application, determining the user is actively using the third software application if input from the user to the third software application is of the second user input type and occurs within the sixth time period of the potentially interrupting event;

when the user is using the third software application, determining the user is not actively using the third software application if input from the user to the third software application is of the first user input type and occurs outside the fifth time period of a potentially interrupting event and if input from the user to the third software application is of the second user input type and occurs outside the sixth time period of the potentially interrupting event;

if the user is actively using the third software application, providing a message from the potentially interrupting event to the user for a third predetermined time period, then automatically removing the message after the third predetermined time period expires without requiring input from the user; and if the user is not actively using the third software application, allowing the potentially interrupting event to interrupt the user while using the third software application.

* * * * *